Jan. 22, 1952 C. J. BISHOFBERGER 2,583,353
PLUG-IN ELECTRICAL DEVICE
Filed April 11, 1949
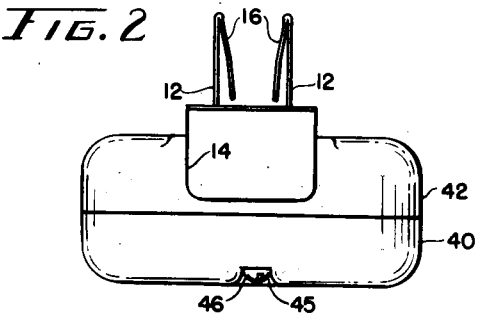
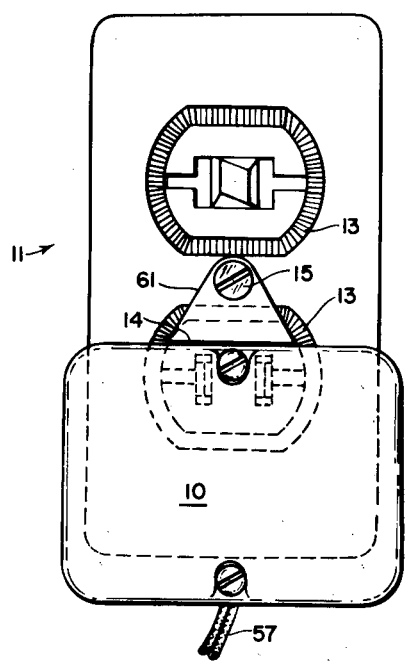
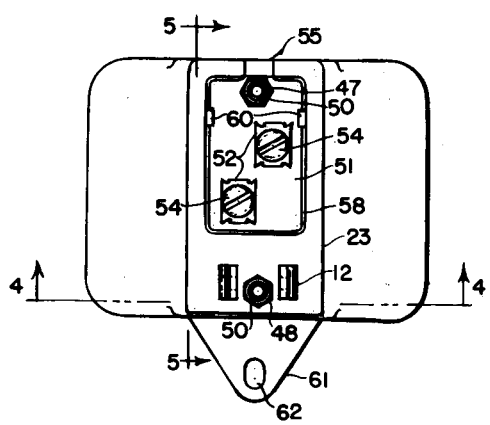
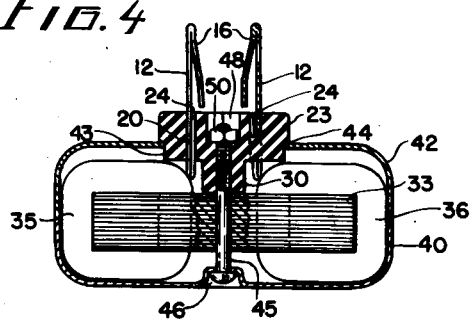
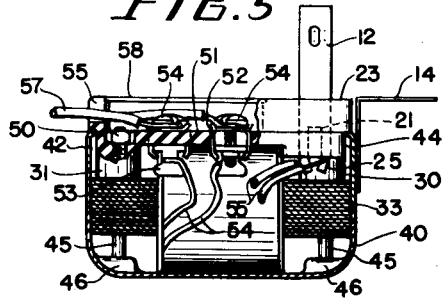
INVENTOR.
CARL J. BISHOFBERGER
BY
George H Fisher
ATTORNEY Patented Jan. 22, 1952

2,583,353

UNITED STATES PATENT OFFICE 2,583,353

PLUG-IN ELECTRICAL DEVICE

Carl J. Bishofberger, Minneapolis, Minn., assignor to Minneapolis-Honeywell Regulator Company, Minneapolis, Minn., a corporation of Delaware Application April 11, 1949, Serial No. 86,745

5 Claims. (Cl. 175—356)

1

My invention relates to a device, such as a transformer, and more particulary to a device of this type adapted for plug-in connection with an electrical outlet receptacle.

It is therefore an object of this invention to provide an improved plug-in electrical device adapted for firm and secure mounting in an electrical outlet receptacle and with readily accessible output connections.

It is also an object of this invention to provide in a device of this type, an improved terminal block of molded construction for mounting plug-in prongs and outlet terminals and permitting accessible connections thereto.

It is further an object of this invention to provide in a transformer design of this type a simplified assembly of the transformer, an enclosing casing and the terminal block.

It is still further an object of this invention to provide a terminal block for a device of this type with a recessed area therein such that connections to terminal posts therein are removed from the exposed surface of the terminal block so as not to interfere with the mounting of the device on an electrical outlet receptacle.

Another object of this invention is to provide a terminal block assembly for a device of this type which is simple and inexpensive to manufacture and easily adapted for mounting and assembly with said devices.

These and other objects of this invention will become apparent from the specification together with the drawings wherein:

Figure 1 is a view of the transformer mounted on an electrical outlet receptacle, Figure 2 is a side elevation of the transformer, Figure 3 is a plan elevation of the back of the transformer, Figure 4 is a sectional veiw of the transformer taken substantially along the lines 4—4 of Figure 3, and Figure 5 is a sectional view of the transformer taken substantially along the lines 5—5 of Figure 3.

The embodiment of the invention to be described may be termed a "plug in" transformer and is adapted to be supported by an electrical outlet receptacle which also supplies current to the primary winding. Since the transformer will usually be exposed in a room it is desirable that the over-all dimensions of the device be as small as possible commensurate with the required current handling capacity, both from an appearance standpoint and considering the possibility of damage either to the transformer or to objects that might accidentally strike it. Particularly important is any reduction that can be made in the distance between the face of the receptacle and the outer surface of the transformer casing. Likewise it is desirable that the exposed surface of the transformer present no sharp corners or protuberances that might catch on clothing. Hence it is advantageous to locate all electrical connecting terminals on a concealed portion of the device for mechanical as well as electrical reasons. The structure herein disclosed provides these desired features with a relatively small number of simple parts.

An additional feature of the device is that provision is made for screw type secondary terminals without sacrificing any of the aforementioned features. This permits cutting the connecting wires to the exact length required as may be desirable for permanent installation of the energized device.

The invention revolves to a large extent around a suitably shaped block of insulating material that carries the input and output connections as well as serving to support and properly locate the transformer and the enclosing case.

Referring now to the drawing, a transformer, generally indicated at 10, is adapted to be supported on a conventional outlet receptacle 11, as shown in Figure 1, by engagement of a pair of terminal prongs 12 with a female socket 13 of the receptacle. While not essential to the invention, the transformer is provided with a bracket 14 that may be secured to the centrally located plate screw 15 of the outlet receptacle 11 particularly when a permanent installation is desired.

Terminal prongs 12 are made of an electrically conductive material and, in the portion of said prongs adapted for engagement with the outlet receptacle, have bent over sections, as at 16, slightly spaced at their free extremities from the main body of each of the prongs. The prongs are also made of a resilient material so that the bent over portion 16 together with the main portion of the prongs when inserted into the socket 13 provide a friction type of engagement to securely mount the transformer on the receptacle. The portions of the prongs, not adapted for engagement with the receptacle also have bent over portions, as at 20, which substantially abut along their entire extent against the main portion of the prong. These portions of the prongs are notched or bifurcated, as at 21, for the purpose of mounting the prongs in a terminal block 23.

Terminal block 23 has a pair of spaced apertures 24 therein of such dimension as to receive the prongs 12 with each aperture terminating in a pair of openings to accommodate the bifurcated ends 21 of the prongs which are inserted through the terminal block. Since the apertures 24 are not of uniform section throughout, prongs 12 will only be inserted into terminal block 23 to a predetermined depth, at which point the ends of the bifurcations will be projecting through the lower surface of the terminal block. These exposed ends of the bifurcated portion 21 of prongs 12 are bent or crimped, as at 25, to secure the prongs rigidly within the terminal block. As will be later noted these exposed ends also provide surfaces to which electrical connections may be made.

Terminal block 23 is made of a suitable electrical insulating material and is generally rectangular in cross section. A pair of boss members 30, 31 extend from the surface of terminal block 23 common to the crimped ends of prongs 12 and are spaced at opposite ends of said block. Bosses 30, 31 mount or abut against a transformer core 33 to position said core with respect to the terminal block. Core 33 is made of a plurality of laminations of magnetic material and is held together in assembled relationship by suitable means, not shown. Mounted on two oppositely disposed legs of core 33 are two coils 35, 36 which are the primary and secondary windings respectively of transformer 10. Coils 35, 36 are wound on insulating spools and mounted on the core before the laminations are secured in assembled relationship in a manner known in the art.

A casing member 40 of non-magnetic material having such dimensions to closely accommodate core 33 with windings 35, 36 thereon encloses the lower portion of transformer 10, as shown in Figures 4 and 5. In this position, windings 35, 36 rest against the bottom and side of casing member 40, thus positioning member 40 with respect to transformer 10. If desired, however, suitable spacer means such as sleeves or helical compression springs may be positioned between core 33 and casing member 40 to position core 23 against the bosses of the terminal block.

A mating casing member 42 of substantially the same dimensions encloses the upper portion of transformer 10, this member having a rectangular opening therein sufficient to accommodate a reduced portion 43 of terminal block 23. A shoulder 44, formed by the main portion of block 23 and its reduced portion 43, engages the casing member 42 and positions the casing with respect to the terminal block 23. The open ends of the casing members 40, 42 meet in abutting relationship and are of the same dimensions such that a smooth surface of abutment is obtained.

Casing members 40, 42, and transformer core 33 are held in assembled relationship on terminal block 23 by means of screws 45 which pass through apertures in casing member 40, core 33 and bosses 30, 31. Casing member 40 has recessed surfaces 46 around its apertures so that the heads of the screws 45 will not project beyond its general surface. Screws 45 upon passing through the aperture in the bosses 30, 31 of terminal block 23 extend into larger apertures 47, 48 in the block which fit and hold nuts 50 into which screws 45 thread to secure the casing members and transformer to the terminal block. Nuts 50 and the exposed ends of the screws are housed in the aperture 47, 48 and are thus removed from the exposed surface of the terminal block. When assembled, transformer core 33 and windings 35, 36 thereon are securely held in place by means of bosses 30, 31 which abut core 33 and casing member 40 which abuts windings 35, 36. Casing members 40, 42 are similarly securely held together and against block 23 by means of screws 45 and nuts 50.

Terminal block 23 also has a recessed surface 51 in which the aperture 48 for one of the nuts 50 is located. This recessed surface mounts a pair of terminals 52 for low voltage connection to transformer 10. Terminals 52 extend through terminal block 23 and have connector lugs 53 located on the under surface of block 23 opposite recessed surface 51. Screws 54 threaded in the terminals 52 secure electrical connections to the upper surface of the terminals.

Lugs 53 of terminals 52 on the under surface of the terminal block are connected by wires 54 to the ends of secondary winding 36, as shown in Figure 5. Similarly primary winding 35 is connected to prongs 12 at the bent over portion 25 by wires 55. The mounting of core 33 on bosses 30, 31 of the terminal block provides for adequate electrical spacing of the prongs 12 and terminal lugs 53 from the metallic parts of the core 33 and casing members 40, 42 and eliminates the hazards of ground or short circuits in these connections to the windings 35, 36.

With these connections, line voltage is supplied through the prong 12 to the primary winding 35, and since such a transformer is usually of the step-down type this will generally be the high voltage side of the transformer. The secondary winding being connected to terminals 52 will supply low voltage at this point. Surface 51 of block 23 is recessed to such a depth that terminals 52 are below the upper surface of terminal block 23 and by this means isolated from the high voltage connections. It is to be understood, however, that the secondary winding may be the high voltage side of the transformer and under such conditions the isolation of terminals 52 from prongs 12 is just as desirable. Further, the concealing of the secondary terminals 52 within terminal block 23 insures against exposed electrical connections and permits the mounting of transformer 10 flush with the surface of the electrical outlet receptacle 11.

Connections, such as are shown at 57 in Figures 1 and 5, are made to terminals 52 in the recessed surface 51 of the terminal block by securing the wires there to with the screw 54 in a well known manner. A notch or opening 55 is formed in the end of block 23 remote from prongs 12, this opening extending into the recessed area formed by surface 51 such that connections 57 may enter the block and be removed from its upper surface thereby permitting flush mounting of the same on an outlet receptacle 11.

While not shown in the drawings, a cover member may be provided to enclose the area formed by recessed surface 51 in terminal block 23. Such a cover would be essential in the case of high secondary voltage. A shoulder 58 is formed in the upper surface of terminal block 12 in the recessed area for the purpose of mounting such a cover and apertures 60 are provided therein for the mounting clips (also not shown) to retain such a cover in position.

As previously noted, bracket 14 is provided when it is desired to permanently install the transformer 10 on the outlet receptacle 11.

Bracket 14 is secured by suitable means, such as spot welding, to casing member 42 and has a portion 61 bent normal to the casing at the upper surface of terminal block 23 so as not to interfere with the flush mounting surface of the terminal block. An aperture 62 is provided in portion 61 of bracket 14 so that it may be mounted on the outlet receptacle by means of the plate screw 15 as shown in Figure 1.

While the invention herein has been disclosed as relating to a "plug in" transformer, it is to be understood that this invention may be used in connection with other control devices for such mounting. In this respect the disclosure is illustrative only and the scope of this invention should therefore be determined only by the appended claims.

I claim:

1. In a transformer, a magnetic core with primary and secondary windings mounted thereon, a casing enclosing said core and said windings with an aperture therein, said casing being mounted on a terminal block of insulating material which is located in and filling said aperture, a pair of electrically conductive prongs fitted into a pair of receiving apertures in said terminal block with a portion thereof extending through said terminal block being bent over at one extremity to secure said prongs to said terminal block and providing a surface to which electrical connections can be made, another portion of said electrically conductive prongs being adapted to fit into a mating electrical receptacle having flexible side portions to secure said prongs in said receptacle, a pair of terminals positioned in other apertures in said terminal block and secured thereto by screws, one extremity of each of said terminals terminating in a recessed area in said terminal block, said terminal block having an aperture through the side thereof connecting to said recessed area, a pair of bosses on one surface of said terminal block abutting said transformer core and spacing said prongs and said terminals from said transformer core, a plurality of electrical conductors connecting said windings to said prongs and said terminals, screw means extending through additional apertures in said casing, said core and said terminal block and terminating in nut receiving apertures in said terminal block securing said transformer in assembled relationship on said terminal block.

2. In a transformer, a magnetic core with primary and secondary windings mounted thereon, a casing enclosing said core and said windings having an aperture of given dimensions therein, a terminal block of insulating material having a surface with dimensions larger than said dimensions of said aperture in said casing and a diametrically opposite surface having dimensions of less than the dimensions of said aperture with a shoulder portion positioned therebetween, said terminal block being positioned in said aperture of said casing such that said surface of lesser dimensions is positioned within said casing with said shoulder portion abutting said casing, a plurality of boss portions integral with said block and extending from said surface of lesser dimensions to abut and mount said core, a pair of electrically conductive prongs fitted into a pair of receiving apertures in said terminal block with portions extending beyond said diametrically opposed surfaces of said terminal block, the portions of said prongs extended beyond said surface of said block of larger dimensions being adapted to fit into a mating electrical receptacle and having flexible side portions to secure said prongs into said receptacle, a pair of terminals positioned in other apertures of said terminal block and secured thereto by screws, one extremity of each of said terminals terminating in a recessed area located on the surface of said terminal block having said larger dimensions, said terminal block having an aperture through a side thereof connected to said recessed area, a plurality of electrical conductors connecting said windings of said transformer to said portions of said prongs and said terminals located beyond the surface of said block having the lesser dimensions, and screw means extending through additional apertures in said casing, said core and said terminal block and terminating in nut receiving apertures in said terminal block securing said transformer in assembled relationship on said terminal block.

3. In a transformer, a magnetic core with primary and secondary windings mounted thereon, a casing enclosing said core and said windings having an aperture of given dimensions therein, a terminal block of insulating material having a surface with dimensions larger than said dimensions of said aperture in said casing and a diametrically opposite surface having dimensions of less than the dimensions of said aperture with a shoulder portion positioned therebetween, said terminal block being positioned in said aperture of said casing such that said surface of lesser dimensions is positioned within said casing with said shoulder portion abutting said casing, a plurality of boss portions integral with said block and extending from said surface of lesser dimensions to abut and mount said core, a pair of electrically conductive prongs fitted into a pair of receiving apertures in said terminal block, with a portion thereof extending beyond said surface of said block of lesser dimension and being bent over to secure said prongs to said terminal block and providing a surface to which electrical connections can be made, another portion of said electrically conductive prongs extending beyond said surface of larger dimensions being adapted to fit into mating electrical receptacles and having flexible side portions to secure said prongs in said receptacle, a pair of terminals positioned in other apertures of said terminal block and secured thereto by screws, one extremity of each of said terminals terminating in a recessed area located on the surface of said terminal block having said larger dimensions, said terminal block having an aperture through a side thereof connected to said recesed area, said boss portions of said terminal block spacing said portions of said prongs and said terminals which extend beyond said surface of said block of said lesser dimensions from said transformer core, a plurality of electrical conductors connecting said windings of said transformer to said portions of said prongs and said terminals located beyond the surface of said block having the lesser dimensions, and screw means extending through additional apertures in said casing, said core and said terminal block and terminating in nut receiving apertures in said terminal block securing said transformer in assembled relationship on said terminal block.

4. A terminal block adapted to mount an electrical control device to adapt said device for electrical connection to and mounting on an electrical outlet receptacle, said terminal block being shaped to provide a pair of diametrically exposed surfaces of appreciable area and a plurality of end surfaces of lesser area, a pair of electrically conductive prongs fitted through apertures in said terminal block and being secured thereto, said prongs each having a portion exposed beyond one of said diametrically opposed surfaces of said block to which electrical connection is adapted to be made and having a pronged portion exposed on the opposite surface of said terminal block which is adapted to be fitted into a mating electrical receptacle, a pair of terminals fitted through said terminal block and terminating in a recesed area of said opposite surface of said terminal block common to said pronged portions, said terminals each having an end portion adapted to receive an electrical connection and projecting beyond said surface of said terminal block common to said electrical connection portion of said prongs first named, said terminal block having an aperture in one end surface thereof communicating with said recessed area to permit electrical connections to be made to said terminals projecting into said recessed area, boss means integral with said first named diametrically opposed surface and opposite said recessed area and adapted to space said exposed portions of said prongs and said terminals on said surface of said terminal block from the control device which is adapted to be mounted on said terminal block, said terminal block including further apertures therein through which screw means are adapted to pass to secure the control device thereon.

5. A terminal block adapted to mount an electrical control device to adapt said device for electrical connection to and mounting on an electrical outlet receptacle, said terminal block being shaped to provide a pair of diametrically exposed surfaces of appreciable area and a plurality of end surfaces of lesser area, a pair of electrically conductive prongs fitted through apertures in said terminal block and secured thereto by bending a portion of said prongs projecting beyond a first of said diametrically opposed surfaces in clamped relationship with said terminal block with said portion exposed beyond said one of said diametrically opposed surfaces of said block so that electrical connections are adapted to be made thereto and having a pronged portion exposed on the opposite surface of said terminal block and adapted to be fitted into a mating electrical receptacle, a pair of terminals fitted through said terminal block and terminating in a recessed area of said opposite surface of said terminal block common to said pronged portions, said terminals each having an end portion adapted to receive an electrical connection and projecting beyond said first named surface of said terminal block common to said electrical connection portion of said prongs first named, said terminal block having an aperture in one end surface thereof communicating with said recessed area to permit electrical connections to be made to said terminals projecting into said recessed area, boss means integral with said first named diametrically opposed surface opposite said recessed area adapted to space said exposed portions of said prongs and said terminals on said surface of said terminal block from the control device which is adapted to be mounted on said terminal block, and means including a shoulder portion on said end surfaces of said terminal block and further apertures through said terminal block by means of which the control device is adapted to be connected to said terminal block and mounted on said boss means.

CARL J. BISHOFBERGER.

REFERENCES CITED

The following references are of record in the file of this patent:

UNITED STATES PATENTS

| Number | Name | Date |
|---|---|---|
| 1,148,699 | McWilliams | Aug. 3, 1915 |
| 1,307,867 | Lee | June 24, 1919 |
| 1,741,265 | Wappler | Dec. 31, 1929 |
| 2,131,483 | Ringwald | Sept. 27, 1938 |
| 2,162,545 | Benander et al. | June 13, 1939 |
| 2,324,053 | Andrews | July 13, 1943 |
| 2,448,339 | Williams | Aug. 31, 1948 |
| 2,491,031 | Burgess | Dec. 13, 1949 |

FOREIGN PATENTS

| Number | Country | Date |
|---|---|---|
| 106,382 | Austria | May 10, 1927 |
| 595,061 | France | Sept. 25, 1925 |